(12) United States Patent
Chen et al.

(10) Patent No.: US 8,840,512 B2
(45) Date of Patent: Sep. 23, 2014

(54) GAPLESS PLANETARY TRANSMISSION

(75) Inventors: Bingkui Chen, Chongqing (CN); Wencui Yi, Chongqing (CN); Chaoyang Li, Chongqing (CN)

(73) Assignee: University of Chongqing, Chongqing (CN)

( * ) Notice: Subject to any disclaimer, the term of this patent is extended or adjusted under 35 U.S.C. 154(b) by 179 days.

(21) Appl. No.: 13/502,185

(22) PCT Filed: Oct. 16, 2009

(86) PCT No.: PCT/CN2009/074481
§ 371 (c)(1),
(2), (4) Date: Jul. 3, 2012

(87) PCT Pub. No.: WO2011/044733
PCT Pub. Date: Apr. 21, 2011

(65) Prior Publication Data
US 2012/0264563 A1    Oct. 18, 2012

(51) Int. Cl.
*F16H 1/32* (2006.01)
*F16H 1/48* (2006.01)
*F16H 57/12* (2006.01)

(52) U.S. Cl.
USPC ............ 475/177; 475/180; 475/336; 475/348

(58) Field of Classification Search
USPC .................... 475/176–180, 338, 348, 336
See application file for complete search history.

(56) References Cited

U.S. PATENT DOCUMENTS

| | | | | |
|---|---|---|---|---|
| 3,602,070 A | * | 8/1971 | Verge et al. ................... | 475/176 |
| 3,861,242 A | * | 1/1975 | Adams et al. ................. | 475/176 |
| 4,023,440 A | * | 5/1977 | Kennington et al. ......... | 475/176 |
| 5,145,468 A | * | 9/1992 | Nagabhusan ................. | 475/179 |

\* cited by examiner

*Primary Examiner* — Jacob S Scott
(74) *Attorney, Agent, or Firm* — Pillsbury Winthrop Shaw Pittman LLP

(57) ABSTRACT

A backlash-free planetary transmission device includes an outer ring of an eccentric sleeve rotatably fitted with a dual outer gear. One outer gear of the dual outer gear is meshed with a fixed pin gear with small teeth number difference, and the other outer gear is meshed with a power output pin gear with small teeth number difference. Each of the fixed pin gear and power output pin gear includes a roller. Profiles of teeth of the outer gears are respectively enveloped by profiles of the fixed pin gear and power output pin gear meshed therewith. The outer gears and rollers are in rolling mesh, to avoid sliding friction between meshed gear teeth. The dual outer gear contacts with the fixed pin gear and power output pin gear, with zero transmission error and zero backlash. The transmission device has high accuracy, low noise, high transmission efficiency, and long service life.

7 Claims, 1 Drawing Sheet

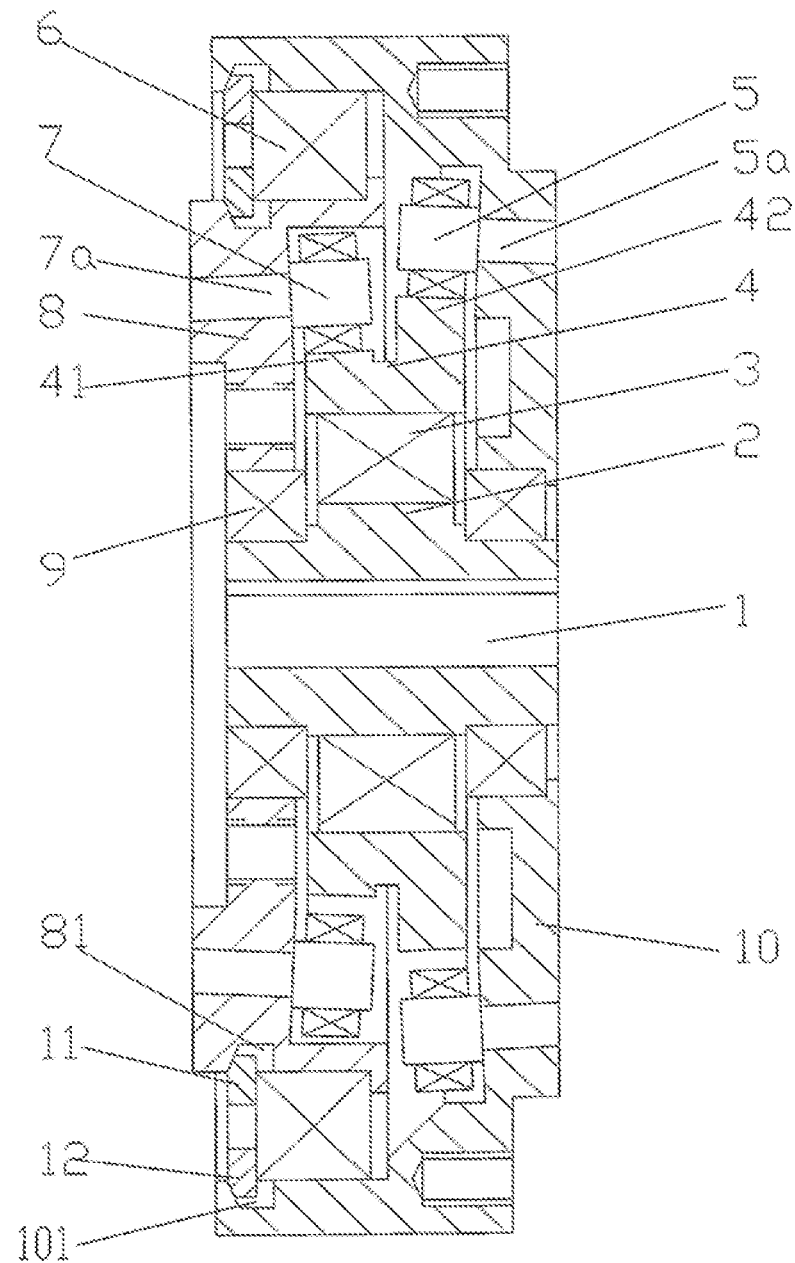

GAPLESS PLANETARY TRANSMISSION

FIELD OF INVENTION

The present invention relates to a planetary transmission device. In particular, the present invention relates to a backlash-free planetary transmission device.

BACKGROUND OF INVENTION

It is relatively difficult to eliminate meshing backlash, reduce transmission noise and improve transmission efficiency in gear transmission. The planetary reducer with small teeth difference has advantages such as steady and high transmission. However, since the reducer also adopts gear pair transmission, there is still a need to eliminate the backlash. Especially for a precision transmission device, elimination of backlash becomes very important.

In order to eliminate backlash in a precision transmission system, a double-disc conical cycloid wheel planetary transmission device is developed, in which a conical cycloid planetary wheel is positioned in the main body and mounted onto a bearing in the middle of an eccentric shaft, to form a conical cycloid wheel planetary gear pair with a conical inner gear having same cone angle, and to form an anti-backlash output mechanism with an output component. Theoretically, such device can realize no-backlash meshing transmission. However, since the teeth in mesh will unavoidably have relative sliding, the backlash may increase friction and decrease efficiency in actual operation. Thus, completely elimination of backlash cannot be achieved. This may cause the mechanical equipment to have large amplitude vibration, loud noise, high energy consumption and low transmission efficiency, etc., so that the mechanism may have poor transmission accuracy and reliability. In addition, existence of sliding may get the teeth badly worn, shorten the lifetime of the mechanism, and increase the cost of use and service.

Thus, there is a need to improve the existing cycloid wheel planetary transmission device, to avoid sliding friction between teeth in mesh, realize no-backlash transmission, improve transmission accuracy, avoid jam phenomenon during operation, reduce wearing between running components, reduce running noise, increase efficiency, and prolong the service life of the mechanism.

SUMMARY OF INVENTION

The present invention intends to provide a backlash-free planetary transmission device, to avoid sliding friction between teeth in mesh, realize backlash-free transmission, improve transmission accuracy, avoid jam phenomenon during operation, reduce wearing between running components, reduce running noise, increase efficiency, and prolong the service life of the mechanism.

The backlash-free planetary transmission device comprises a housing, a power input shaft and a power output shaft. The power input shaft is provided with an eccentric sleeve secured on the circumference. The outer ring of the eccentric sleeve rotatably fits with a dual outer gear. A fixed pin gear is set on the housing that is concentric with the power input shaft. A power output pin gear is set on the power output shaft in circumferential transmission fit and concentric with the power input shaft. An outer gear of the dual outer gear is meshed with the fixed pin gear with small teeth difference, and the other outer gear is meshed with the power output pin gear with small teeth difference. The pin teeth of both the fixed pin gear and the power output pin gear include a roller that can rotate around its own axis. The outer surface of the roller is a teeth surface. The profiles of teeth of the two outer gears of the dual outer gear are respectively enveloped by profiles of the fixed pin gear and the power output pin gear meshed therewith.

In one embodiment, both the fixed pin gear and the power output pin gear are bevel gears formed by tilting the roller, and two outer gears of the dual outer gear corresponding thereto are bevel gears. The fixed pin gear tapers in a direction opposite to that of the power output pin gear.

In one embodiment, the fixed pin gear has same taper as that of the power output pin gear.

In one embodiment, the teeth of the fixed pin gear and power output pin gear further include a roller shaft. The roller rotatably fits onto the roller shaft. The roller shaft of the fixed pin gear teeth is arranged on the housing, and the roller shaft of the power output pin gear teeth is positioned on the power output shaft.

In one embodiment, the power input shaft and the eccentric sleeve integrally form an eccentric shaft arrangement.

In one embodiment, the roller rotatably fits with the roller shaft via a rolling bearing.

In one embodiment, the outer ring of the power output shaft rotatably fits with the housing via a rolling bearing I. The dual conical outer gear is positioned around the outer ring of the eccentric sleeve with a rolling bearing II and rotatably fits therewith. The power output shaft is positioned around the outer ring of the power input shaft with a rolling bearing III and rotatably fits therewith.

In one embodiment, an end of the housing to which the rolling bearing I corresponds has an outer collar slot on the inner ring. The outer collar slot is embedded with an outer elastic collar on the outer side of the bearing outer ring of the rolling bearing I. An abutted surface between the outer end surface of the outer elastic collar and the outer slot edge of the outer collar slot is a radially slanted surface that forms an obtuse angle with the bottom of the outer collar slot. An inner collar slot is arranged on an outer ring at an end on the outer side of the power output shaft. The inner collar slot is embedded with an inner elastic collar on the outer side of the bearing inner ring of the rolling bearing I. An abutted surface between the outer end surface of the inner elastic collar and the outer slot edge of the inner collar slot is a radially slanted surface that forms an obtuse angle with the bottom of the inner collar slot.

The present invention has the following advantages: The present invention provides a backlash-free planetary transmission device, in which the planetary gear adopts a dual-gear arrangement, the pin gear adopts a rolling arrangement, the outer gear and roller are pure rolling mesh, to avoid sliding friction between meshed gear teeth. When installed, the backlash between the pin gear and the planetary gear can be eliminated. With extended period of use, the backlash can be auto-compensated. The dual-gear of the backlash-free planetary gear contacts with the teeth of both the fixed pin gear and the power output pin gear, with zero transmission error and zero gear backlash. The transmission device has high accuracy, low noise, high transmission efficiency and long service life. The pure rolling mesh avoids jam phenomenon, and alleviate wear between running components. The backlash-free planetary gear of the present invention can be processed with a gear processing cutting tool or abrasive wheel. The pin gear can adopt any end product of roller or roller shaft, reducing the difficulties of processing and manufacturing.

BRIEF DESCRIPTION OF DRAWINGS

The present invention will be described in detail in connection with the drawings and embodiments discussed below.

The FIGURE is a schematic view of the structure according to one embodiment of the present invention.

DETAILED DESCRIPTION OF PREFERRED EMBODIMENTS

FIG. 1 is a schematic view of a structure of a backlash-free planetary transmission device according to one embodiment of the present invention. As shown in FIG. 1, the backlash-free planetary transmission device comprises a housing 10, a power input shaft 1 and a power output shaft 8. An eccentric sleeve 2 is securely positioned on the circumference of the power input shaft 1. The outer ring of the eccentric sleeve 2 rotatably fits with a dual outer gear 4. A fixed pin gear 5 is set on the housing 10 that is concentric with the power input shaft 1. A power output pin gear 7 is set on the power output shaft 8 in circumferential transmission fit and concentric with the power input shaft. An outer gear 42 of the dual outer gear 4 is meshed with the fixed pin gear 5 with small teeth difference, and the other outer gear 41 is meshed with the power output pin gear 7 with small teeth difference. In this embodiment, the tip diameter of the outer gear 42 is larger than that of the outer gear 41. The pin teeth of both the fixed pin gear 5 and the power output pin gear 7 each include a roller that can rotate around its own axis. The outer surface of the roller is a teeth surface. Both the fixed pin gear 5 and the power output pin gear 7 are bevel gears formed by tilting the roller, and the outer gear 42 and outer gear 41 corresponding thereto are bevel gears. The fixed pin gear 5 tapers in a direction opposite to that of the power output pin gear 7.

The present invention adopts meshing arrangement with bevel gears, and the fixed pin gear 5 tapers in a direction opposite to that of the power output pin gear 7. Upon the outer gear 42 and outer gear 41 of the dual outer gear 4 meshed with the fixed pin gear 5 and the power output pin gear 7, the axial component of force allows the meshed teeth of the two meshing pairs to contact with each other, to satisfy the closed principle of circular indexing error. Thus, the transmission device has properties of zero transmission error and zero gear backlash.

In this embodiment, the profiles of the two outer gear (i.e., outer gear 42 and outer gear 41) teeth of the dual conical outer gear are respectively enveloped by profiles of the fixed pin gear 5 and the power output pin gear 7 meshed therewith, to effectively eliminate backlash.

In this embodiment, the fixed pin gear 5 has same taper as that of the power output pin gear 7. This simplifies the manufacturing process, balances the respective axial force components, and facilitates stable transmission.

In this embodiment, the power input shaft 1 and the eccentric sleeve 2 are integrally formed. This makes the manufacturing easy, allows the transmission mechanism compact, and allows installation/removal simple.

In this embodiment, the teeth of the fixed pin gear 5 and power output pin gear 7 further include a roller shaft (i.e., roller shaft 5a and roller shaft 7a as shown in FIG. 1, respectively). The roller rotatably fits onto the roller shaft. The roller shaft 5a of the fixed pin gear teeth is arranged on the housing 10, and the roller shaft 7a of the power output pin gear teeth is positioned on the power output shaft 8. This makes the structure simple and compact, and allows easy installation and removal.

The rollers of the fixed pin gear 5 and the power output pin gear 7 rotatably fit with the respective roller shaft (i.e., roller shaft 5a and roller shaft 7a) via a rolling bearing. This reduces friction between the roller and the roller shaft, reduces noise and transmission resistance, and prolongs the service life of the pin gears.

In this embodiment, the outer ring of the power output shaft 8 rotatably fits with the housing 10 via a rolling bearing I 6. The dual conical outer gear 4 is positioned around the outer ring of the eccentric sleeve 2 with a rolling bearing II 3 and rotatably fits therewith. The power output shaft 8 is positioned around the outer ring of the power input shaft with a rolling bearing III 9 and rotatably fits therewith. This simplifies the assembly structure, reduces transmission consumption, and improves transmission efficiency.

In this embodiment, an end of the housing 10 to which the rolling bearing I 6 corresponds has an outer collar slot 101 on the inner ring. The outer collar slot 101 is embedded with an outer elastic collar 12 on the outer side of the bearing outer ring of the rolling bearing I 6. An abutted surface between the outer end surface of the outer elastic collar 12 and the outer slot edge of the outer collar slot 101 is a radially slanted surface that forms an obtuse angle with the bottom of the outer collar slot 101. An inner collar slot 81 is arranged on an outer ring at an end on the outer side of the power output shaft 8. The inner collar slot 81 is embedded with an inner elastic collar 11 on the outer side of the bearing inner ring of the rolling bearing I 6. An abutted surface between the outer end surface of the inner elastic collar 11 and the outer slot edge of the inner collar slot 81 is a radially slanted surface that forms an obtuse angle with the bottom of the inner collar slot 81. The inner elastic collar 11 and outer elastic collar 12 radially expand with their own elasticity. The radially slanted surface can help auto-eliminate the axial clearance of the rolling bearing I 6, to further ensure the stability of operation, reduce transmission noise, and prolong the service life of the bearing.

It shall be noted that the above embodiments are only used for illustration but not limitation. Although the present invention has been described in connection with the preferred embodiments, people skilled in the art should understand that the technical solutions of the present invention can be modified or equivalently replaced without departing from the spirit and scope of the present invention, which shall be covered by the appended claims.

We claim:

1. A backlash-free planetary transmission device, comprising:
   a housing;
   a power input shaft and a power output shaft;
   an eccentric sleeve securely positioned on a circumference of the power input shaft;
   a dual outer gear including a first outer gear and a second outer gear;
   an outer ring of the eccentric sleeve that rotatably fits with the dual outer gear;
   a fixed pin gear on the housing and that is concentric with the power input shaft; and
   a power output pin gear on the power output shaft in circumferential transmission fit and that is concentric with the power input shaft, wherein
   the first outer gear of the dual outer gear is meshed with the fixed pin gear with small teeth number difference;
   the second outer gear of the dual outer gear is meshed with the power output pin gear with small teeth number difference;
   each of the fixed pin gear and the power output pin gear includes a roller that can rotate around its own axis;
   an outer surface of the roller is a gear surface;

profiles of teeth of the first and second outer gears of the dual outer gear are respectively enveloped by profiles of the fixed pin gear and the power output pin gear meshed therewith;

both the fixed pin gear and the power output pin gear are bevel gears formed by tilting the roller;

the first and second outer gears of the dual outer gear are bevel gears; and the fixed pin gear tapers in a direction opposite to that of the power output pin gear.

2. The backlash-free planetary transmission device according to claim 1, wherein the fixed pin gear has a taper which is the same as a taper of the power output pin gear.

3. The backlash-free planetary transmission device according to claim 2, wherein each of the fixed pin gear and the power output pin gear further includes a roller shaft;

the roller of each of the fixed pin gear and the power output pin gear rotatably fits onto a respective one of the roller shafts;

the roller shaft of the fixed pin gear teeth is arranged on the housing; and the roller shaft of the power output pin gear teeth is positioned on the power output shaft.

4. The backlash-free planetary transmission device according to claim 3, wherein the power input shaft and the eccentric sleeve integrally form an eccentric shaft arrangement.

5. The backlash-free planetary transmission device according to claim 4, wherein the roller rotatably fits with the roller shaft via a rolling bearing.

6. The backlash-free planetary transmission device according to claim 5, wherein an outer ring of the power output shaft rotatably fits with the housing via a first rolling bearing;

the dual outer gear is positioned around the outer ring of the eccentric sleeve with a second rolling bearing and rotatably fits therewith; and the power output shaft is positioned around an outer ring of the power input shaft with a third rolling bearing and rotatably fits therewith.

7. The backlash-free planetary transmission device according to claim 6, wherein an end of the housing to which the first rolling bearing corresponds has an outer collar slot on an inner ring of the end;

the outer collar slot is embedded with an outer elastic collar on the outer side of a bearing outer ring of the first rolling bearing;

an abutted surface between an outer end surface of the outer elastic collar and an outer slot edge of the outer collar slot is a radially slanted surface that forms an obtuse angle with a bottom of the outer collar slot;

an inner collar slot is arranged on an outer ring at an end on an outer side of the power output shaft;

the inner collar slot is embedded with an inner elastic collar on an outer side of a bearing inner ring of the first rolling bearing; and an abutted surface between an outer end surface of the inner elastic collar and an outer slot edge of the inner collar slot is a radially slanted surface that forms an obtuse angle with a bottom of the inner collar slot.

* * * * *